United States Patent
Tadokoro

[15] 3,653,205
[45] Apr. 4, 1972

[54] REACTOR FOR INTERNAL COMBUSTION ENGINE

[72] Inventor: Tomoo Tadokoro, Kure-shi, Japan

[73] Assignee: Toyo Kogyo Company Limited, Hiroshima, Japan

[22] Filed: Apr. 24, 1970

[21] Appl. No.: 31,635

[30] Foreign Application Priority Data

Apr. 24, 1969 Japan...................................44/32152

[52] U.S. Cl..............................60/29 A, 23/277 C, 285/187
[51] Int. Cl........................................F01n 3/10, F16l 51/00
[58] Field of Search.................60/29, 30; 23/277 C; 285/187

[56] References Cited

UNITED STATES PATENTS

| 3,413,803 | 12/1968 | Rosenlund | 60/30 |
| 3,486,326 | 12/1969 | Hermes | 60/30 |

Primary Examiner—Douglas Hart
Attorney—Sughrue, Rothwell, Mion, Zinn and Macpeak

[57] ABSTRACT

A reactor for purifying exhaust gas in an exhaust gas system of an internal combustion engine comprises an inner shell forming a reaction chamber and an outer shell surrounding the inner shell and defining an adiabatic zone therebetween. A pipe member extends through the outer shell to the inner shell for absorbing the heat expansion of the inner shell. The pipe member disposed for movement in the axial direction and in the direction normal to the axis of the pipe member relative to the outer shell for maintaining the seal between the adiabatic zone and the reaction chamber.

17 Claims, 7 Drawing Figures

INVENTOR
TOMOO TADOKORO

REACTOR FOR INTERNAL COMBUSTION ENGINE

BACKGROUND OF THE INVENTION

1. Field of the Invention

This invention relates to a device for reburning exhaust gas to purify the zone in an exhaust gas system of an internal combustion engine. The device comprises an inner shell forming a reaction chamber and an outer shell surrounding the inner shell and defining an adiabatic space at the outside of the inner shell, and more particularly to means for absorbing the heat expansion of the inner shell due to the heat of the exhaust gas itself and the combustion heat generated within the reaction chamber and at the same time, maintaining the seal between the reaction chamber and the adiabatic space.

2. Description of the Prior Art

In general, it is well known that the structure of a reactor for purifying an exhaust gas may be of multi-layer, spaced walls forming an adiabatic space or zone in order to prevent a high temperature of the exhaust gas or the combustion heat produced in the reaction chamber of the reactor from radiating to the exterior thereof, namely in order to maintain the reaction chamber at high temperature or to prevent the heat of the reaction chamber from being transmitted to the engine room and from making the engine room temperature high. In such a reactor the temperature difference between the inner and outer shells is extremely large with the result that the difference of the heat expansion between the inner and outer shells is also extremely large. Moreover, if an adiabatic insulator material fills the adiabatic space, the said difference of the heat expansion becomes extremely large.

If the inner shell producing larger heat expansion is integrally connected to the outer shell which hardly produces the heat expansion or to a flange for fixing the reactor to the internal combustion engine body, the inner shell experiences large internal stress because the heat expansion of the inner shell is restricted, so that a crack may occur at the portion having a large stress concentration with the result that it adversely affects the endurability of the reactor.

SUMMARY OF THE INVENTION

The present invention provides a reactor which purifies the exhaust gas of an internal combustion engine to eliminate the aforementioned disadvantages of the conventional reactor. Further, the reactor seal between the adiabatic space and the reaction chamber is retained regardless of the heat expansion of this inner shell.

The other object, advantages and features of the present invention will become further apparent from the following description taken in conjunction with the accompanying drawings.

DESCRIPTION OF THE PREFERRED EMBODIMENT

Figure 1:
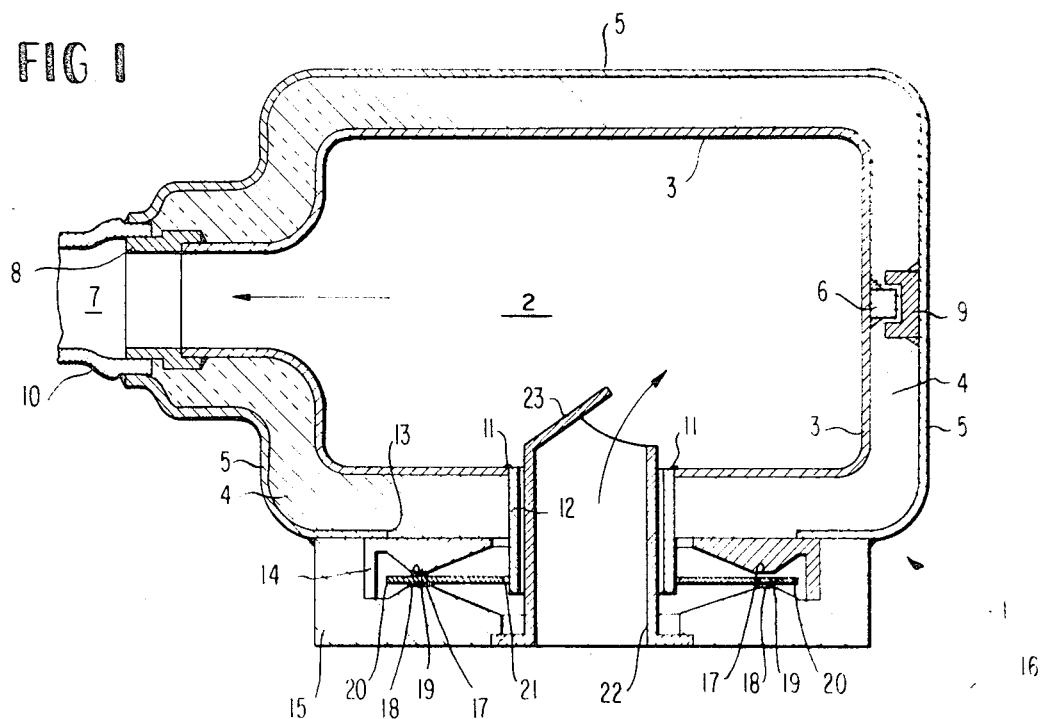
FIG. 1 is a cross sectional view of one embodiment of a device for reburning an exhaust gas constructed in accordance with the present invention.

In FIG. 1, which shows a first embodiment of the present invention, a reactor 1 comprises an inner shell 3 forming a reaction chamber 2, and an outer shell 5 surrounding the outside of the inner shell 3 separated by an adiabatic space or zone 4. The inner shell 3 has a pin 6 fixed to one end, at the outside thereof, and an axial tube 8 forming an exhaust outlet 7 is fixed to the other end. The outer shell 5 has a supporting shaft 9 and an exhaust tube 10 for supporting the inner shell 3 fixed to both ends at the inside thereof. The pin 6 and supporting shaft 9, and the axial tube 8 and exhaust tube 10 are slidably connected to each other so that the inner shell 3 may expand or contract within the outer shell 5. Further, an adiabatic insulation material may fill, if required, the adiabatic space 4 formed between the outer and inner shells 5 and 3. The inner shell 3 carries an opening 11 for the inlet of the exhaust gas, and the pipe member 12 extends inwardly through the outer shell 5 for fixing the inner end of the pipe member 12 to the opening 11. The outer shell 5 carries an opening 13 corresponding to the position of the opening 11 of the inner shell and having a 3 larger outer diameter than that of the pipe member 12 so that it does not limit the movement of the pipe member 12 passing through the opening 13. The reactor also comprises an auxiliary base 14 provided at the outside of the outer shell 5 such that the auxiliary base 14 is spaced from the pipe member 12 so as not to limit movement of the pipe member 12. A flange 15 is fixed to the outer shell 5 for mounting the reactor 1 to an engine block 16. A flat sealing plate member 20 has a disk surface 19 sealingly and slidably disposed between a supporting portion 17 of the auxiliary base 14 and a supporting portion 18 of the flange 15 and carries an opening 21 corresponding to the outer periphery of the pipe member 12 so that it is sealingly and slidably engaged with the pipe member 12. Thus, the gaps between the disk surface 19 of the sealing plate member 20 and the supporting portion 17 of the auxiliary base 14 and the supporting portion 18 of the flange 15 and between inner peripheral surface of the opening 21 and the outer periphery of the pipe member 12 are very small so as not to introduce the exhaust gas within the reaction chamber 2 into the adiabatic space or zone 4. An inner pipe 22 passing through the pipe member 12 connects the reaction chamber 2 directly to the engine block 16 to form a duct and is engaged with the flange 15 so that the inner pipe 22 is fixed to the engine block 16 when the flange 15 is fixed to the engine block 16. And, the inner pipe 22 has smaller outer diameter than the inner diameter of the pipe member 12 so that it does not limit the movement of the pipe member 12. Since the inner pipe 22 forms a duct of uniform cross section from the engine block 16 to the reaction chamber 2, it may lessen the exhaust resistance of the exhaust gas.

Since the inner pipe 22 is not fixed to any portion of the reactor 1 by such as welding, it may be treated in heat resistance separately from the reactor with the result that its expense is reduced. Further, since it employs the inner pipe 22 as double-layer at the passage to the reaction chamber 2 with the pipe member 12, the performance of the reactor 1 is improved. And, since the baffle plate 23 which varies the flow of the exhaust gas at the end of the inner pipe 22, holds the staying time of the exhaust gas thereof within the reaction chamber 2, the burning time of the exhaust gas within the reaction chamber 2 is lengthened with the result that combustion of the unburned component is improved. Since the baffle plate 23 varies the flow of the exhaust gas, the dynamic pressure of the exhaust gas can not act directly on the inner shell 3, it improves the endurability of the inner shell 3 and at the same time, the noise of the inner shell 3 due to the dynamic pressure is eliminated. In this embodiment, the sealing plate member 20 is sealingly and slidably interleaved by the flange 15 fixed to the outer shell 5 and the auxiliary base 14, the pipe member 12 is sealingly and slidably inserted into the sealing plate member 20 and the inner end of the pipe member 12 is fixed to the inner shell 3. Accordingly, if the inner shell 3 is heated and expanded perpendicularly to the axis of the pipe member 12 by the heat of the exhaust gas itself and the reburning heat, the pipe member 12 fixed to the inner shell 3 and the sealing plate member 20 maintains the seal between the reaction chamber 2 and the adiabatic space 4 due to movement with the inner shell 3 in the direction normal to the axis. If the inner shell 3 and pipe member 12 expand in the axial direction of pipe member 12, pipe member 12 being slidably inserted through the sealing plate member 20, pipe member 12 maintains the seal between the reaction chamber 2 and the adiabatic space 4 due to its movement axially.

Figure 2:
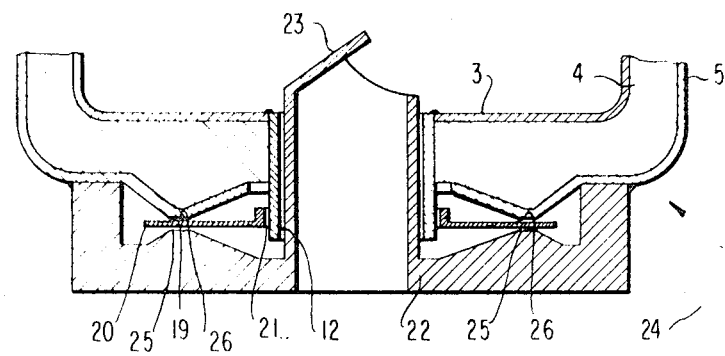
FIGS. 2 through 7 are cross sectional views of the main parts of various embodiments of such devices for reburning exhaust gas constructed according to the invention wherein like parts and components are designated by the same reference numerals and characters as those shown in FIG. 1.

The second embodiment will now be described with reference to FIG. 2.

In this embodiment, a pipe member 12 passes through an outer shell 5 and after being inserted into an opening 11 of inner shell 3, and it is welded thereto. Opening 13 of the outer shell 5 is of larger inner diameter than the outer diameter of the pipe member 12 so as not to restrict the movement of the pipe member 12. A sealing plate member 20 comprises a cylindrical portion having an opening 21 corresponding to the outer periphery of the pipe member 12 and a disk surface 19 of collar shape. An inner pipe 22 passes through the pipe member 12 and has a baffle plate 23 at its end to connect the reaction chamber 2 directly to the end of an exhaust manifold 24 and to form a duct. The inner pipe 22 also comprises a flange portion for fixing the outer shell 5 and mounting the outer shell 5 to the end of the exhaust manifold 24 and has a smaller outer diameter than the inner diameter of the pipe member 12. A proper gap exists between the outer end of the pipe member 12 and the flange portion of the inner pipe 22 so as not to limit the movement of the pipe member 12. A supporting portion 25 of this flange portion slidably engages the disk surface 19 of the sealing plate member 20 with a supporting portion 26 of the outer shell 5. And the sealing plate member 20 is sealingly and slidably engaged with the pipe member 12 at opening 21. Thus, the gaps between the disk surface 19 of the sealing plate member 20 and the supporting portions 25 and 26, and between the opening 21 and the pipe member 12 are very small so as not to introduce the exhaust gas within the reaction chamber 2 into the adiabatic space 4.

This embodiment sealing and slidably engages the sealing plate member 20 by the outer shell 5 and the inner pipe 22. The pipe member 12 is sealingly and slidably inserted into the sealing plate member 20, and the inner end of the pipe member 12 is fixed to the inner shell 3. Accordingly, this embodiment provides the same advantages as those of the first embodiment.

Figure 3:
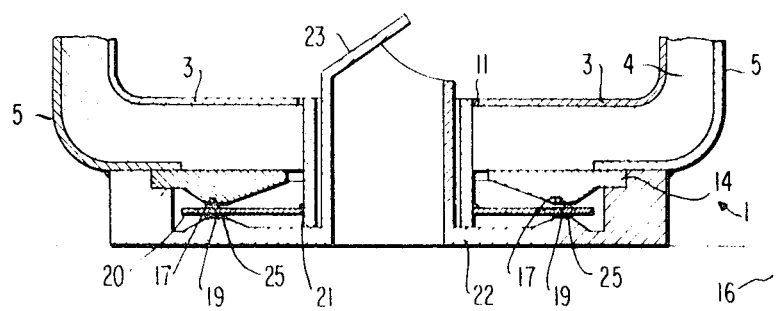

The third embodiment will now be described referring to FIG. 3.

A pipe member 12 passes through an opening 11 of an inner shell 3 and is sealingly and slidably engaged therewith. An inner pipe 22 has a flange portion for mounting it to an engine block 16 and for fixing it to an outer shell 5 and has a gap between it and the pipe member 12 so as not to limit the movement of the pipe member 12. An auxiliary base 14 contacts an adiabatic space 4 thereinside which does not restrict the pipe member 12. A sealing plate member 20 comprises a disk surface 19 sealingly and slidably interleaved between a supporting portion 17 of the auxiliary base 14 and a supporting portion 25 of the inner pipe 22 and has an opening 21 corresponding to the outer periphery of the pipe member 12 and fixed to the outer end of the pipe member 12 at said opening 21.

This embodiment sealingly and slidably engages the sealing plate member 20 by the inner pipe 22 and auxiliary base 14. The pipe member 12 is fixed to the sealing plate member 20 and sealingly and slidably engages the pipe member 12 with the inner shell 3. For this reason, if the inner shell 3 expands by heat in the direction normal to the axis of the pipe member 12, the pipe member 12 and the sealing plate member 20 fixed thereto, move in the direction normal to the axis with the inner shell 3 to maintain the seal between the reaction chamber 2 and the adiabatic space 4. If it expands axially by heat, the inner shell 3 moves axially along the pipe member 12 and is sealingly held between the reaction chamber 2 and the adiabatic space.

Figure 4:
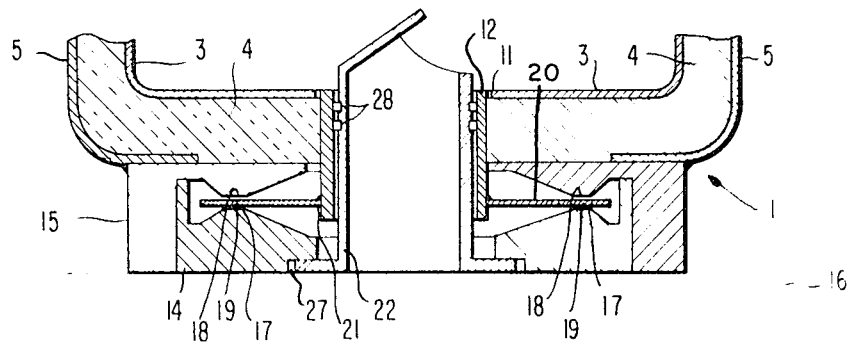

The fourth embodiment will now be described with reference to FIG. 4.

A pipe member 12 passes through an outer shell and sealingly and slidably engages an opening 11 of an inner shell 3. A flange 15 is fixed on outer shell 5 for mounting a reactor 1 to an engine block 16 and mounts an auxiliary base 14 to the engine block 16. A sealing plate member 20 comprises a disk surface 19 sealingly and slidably interleaved by a supporting portion 18 of the flange 15 and a supporting portion 17 of the auxiliary base 14 and has an opening 21 for fixing the pipe member 12 thereto. An inner pipe 22 having smaller outer diameter than the inner diameter of the pipe member 12 extends through the pipe member 12 and moves sealingly and slidably in the direction normal to the axis of the pipe member 12 in response to the movement in the direction normal to the axis of the pipe member 12. The auxiliary base 14 has an annular groove 27 permitting this movement. Furthermore, in order to maintain a seal between reaction chamber 2 and an adiabatic space 4, a ring 28 is sealingly inserted between the pipe member 12 and the inner pipe 22. And, the conventional reactor which does not have a ring tends to create noise due to the wear of the disk surface 19 of the sealing plate member 20 and the supporting portion 17 and 18 of the auxiliary base 14 and flange 15 due to the dynamic pressure of the exhaust gas between the pipe member 12 and the inner pipe 22. The reactor having the ring of this invention eliminates this disadvantage of the conventional reactor. A reactor in which the inner pipe 22 sealingly and slidably engages the pipe member 12, without the ring 28, has the same effect of this embodiment provided ring 28.

This embodiment sealingly and slidably interleaves a sealing plate member 20 between the flange 15 and auxiliary base 14 and sealingly and slidably interleaves an inner pipe 22 between the auxiliary base 14 and engine block 16 which moves similarly to the pipe member 12 in the direction normal to the axis of the pipe member 12. The pipe member 12 which sealingly and slidably engages the inner shell 3 is fixed to the sealing plate member 20. For this reason, if the inner shell 3 expands by heat in the direction normal to the axis of the pipe member 12, the pipe member 12 and sealing plate member 20 fixed thereto and the ring 28 and inner pipe 22 move sealingly and slidably in the direction normal to the axis of the inner pipe 22 together with the inner shell 3, sealingly held between the reaction chamber 2, and the adiabatic space 4. If it expands by heat in the axial direction, the inner shell 3 sealingly and slidably moves along the pipe member 12 axially between the reaction chamber 2 and the adiabatic space 4.

Figure 5:
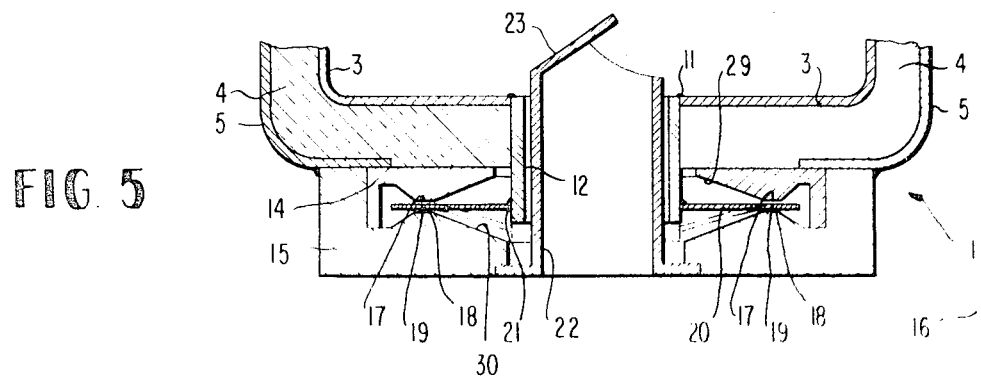

The fifth embodiment of this invention will be described referring to FIG. 5.

A pipe member 12 extends inwardly through an outer shell 5, with the inner end of said pipe member 12 fixed to an inner shell 3 at opening 11. An auxiliary base 14, flange 15, and inner pipe 22 are provided similarly to those in the first embodiment of this invention as previously described. A sealing plate member 20 is sealingly and slidably interleaved by a supporting portion 17 of the auxiliary base 14 and a supporting portion 18 of the flange 15 and is fixed to the pipe member 12 at opening 21. Furthermore, the sealing plate member 20 may be a resilient material which may resiliently deform in the axial direction of the pipe member 12. The auxiliary base 14 and flange 15 comprises inclined surfaces 29 and 30 for escaping the resilient deformation of the sealing plate member 20.

This embodiment interleaves the sealing plate member 20 sealingly and slidably between the flange 15 and auxiliary 14 and fixes the sealing plate member 20 made of resilient material and inner shell 3 to the pipe member 12. Accordingly, if the inner shell 3 expands by heat in the direction normal to the axis of the pipe member 12, the pipe member 12 fixed integrally to the inner shell 3 and sealing plate member 20 sealingly and slidably move in the direction normal to the axis of the pipe member 12 to maintain the seal between the reaction chamber 2 and the adiabatic space 4. If the inner shell 3 expands by heat in the axial direction of the pipe member, the pipe member 12 fixed to the inner shell 3 deforms the sealing plate member 20 of the resilient material fixed to the pipe member 12, so as to move in a direction to maintain the seal between the reaction chamber 2 and the adiabatic space 4.

Figure 6:
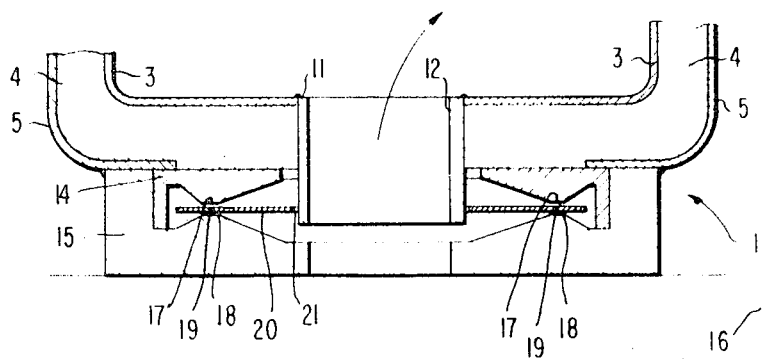

The sixth embodiment will now be described with reference to FIG. 6.

A pipe member 12 passes through an outer shell 5 fixed to an inner shell 3 at opening 11. A flange 15 for fixing the outer shell 5 and for mounting a reactor 1 to an engine block 16 fixes an auxiliary base 14 to the outer shell 5. A sealing plate member 20 has a disk surface 19 sealingly and slidably interleaved between a supporting portion 18 of the flange 15 and a supporting portion 17 of the auxiliary base 14 so as to engage, sealingly and slidably, the pipe member 12 at an opening 21 corresponding to the outer periphery of the pipe member 12.

This embodiment may effect the same operation and advantages as those of the first embodiment by omitting the inner pipe 22 and having the pipe member 12 act as an inlet duct to introduce the exhaust gas from the engine block 16 into the reaction chamber 2. Accordingly, the pipe member 12 defines a gap which allows expansion thereof in the axial direction of the pipe member 12 between the outer end thereof and the engine block 16. The inner diameter of which may be determined so as not to block the exhaust port of the engine block 16 due to expansion in the direction normal to the axis thereof.

Figure 7:
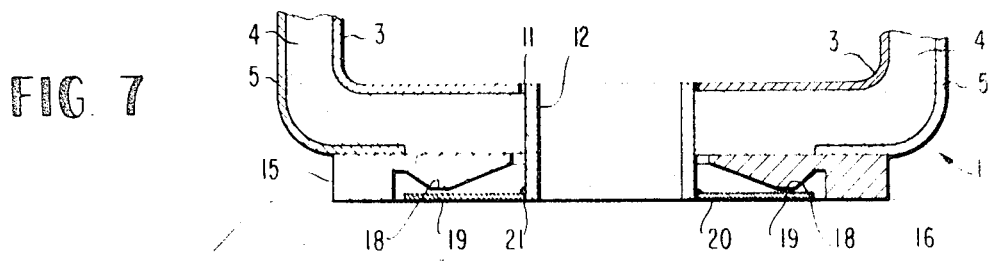

The seventh embodiment will be described with respect to FIG. 7.

A pipe member 12 passing through an outer shell 5 engages sealingly and slidably with an opening 11 of an inner shell 3. A flange 15 fixes an outer shell 5 to an engine block 16. A flat sealing plate member 20 comprises a disk surface 19 sealingly and slidably interleaved by the supporting portion 18 of the flange 15 and the engine block 16 and at an opening 21, it is fixed to the outer end of the pipe member 12.

If the inner shell 3 expands by heat in the axial direction of the pipe member 12, the inner shell 3 moves axially along the pipe member 12 while if it expands by heat in the direction normal to the axis, the pipe member 12 and sealing plate member 20 move in the direction normal to the axis with the inner shell 3. This embodiment omits the inner pipe 22 and pipe member 12 itself acts as an inlet duct to introduce the exhaust gas from the engine block 16. Accordingly, the inner diameter of the pipe member 12 is such that it does not merely block the exhaust port of the engine block 16 by the heat expansion in the direction normal to the axis.

What is claimed is:

1. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, and an inlet for introducing exhaust gas into said reaction chamber and an outlet for exhausting exhaust gas therefrom, the improvement comprising:
    a. said inner shell including a first inlet opening for the exhaust gas,
    b. said outer shell having a second opening correspondingly positioned to the inlet opening provided in said inner shell,
    c. a pipe member extending inwardly through said second opening and connected to said first opening,
    d. a sealing plate member having a third opening corresponding to the outer periphery of said pipe member and receiving said pipe member,
    e. means for slidably and sealably positioning said sealing plate member between said outer shell and the block or exhaust manifold of said engine,
    f. means connecting said sealing plate member to said pipe member at said third opening, and
    g. means permitting either said pipe member or said sealing plate member to move in the axial direction of said pipe member, whereby said inner shell may freely move bidirectionally in the axial direction of said pipe member and in a direction normal to the axis thereof with respect to said outer shell due to its heat expansion while maintaining said adiabatic zone sealed from said reaction chamber.

2. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and outlet for exhausting exhaust gas therefrom, the improvement comprising:
    a. said inner shell including a first inlet opening for the exhaust gas,
    b. said outer shell having a second opening correspondingly positioned to the inlet opening provided in said inner shell,
    c. a pipe member extending inwardly through said second opening,
    d. means connecting said pipe member to said inner shell at said first opening,
    e. a sealing plate member having a third opening corresponding to the outer periphery of said pipe member and movable in the axial direction of said inner shell and positioned between said outer shell and an engine block or exhaust manifold,
    f. means connecting said sealing plate member to said pipe member with said third opening receiving said pipe member,
    g. means slidably and sealingly supporting said sealing plate member for movement in the axial direction of said inner shell and
    h. at least one of the connecting means between said inner shell and said pipe member and between said pipe member and said sealing plate member being slidable bidirectionally in the axial direction of said pipe member, whereby said inner shell may move both in the axial direction of said pipe member and in the direction normal to the axis thereof with respect to said outer shell due to its heat expansion while maintaining said adiabatic zone sealed from said reaction chamber.

3. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:
    a. said inner shell including a first inlet opening for the exhaust gas,
    b. said outer shell having a second opening correspondingly positioned to the inlet opening provided in said inner shell,
    c. a pipe member extending inwardly through said second opening and fixed to said inner shell at said first opening,
    d. a sealing plate member having a third opening corresponding to the outer periphery of said pipe member, fixed to said pipe member at said third opening and lying between said outer shell and an engine block or exhaust manifold, and
    e. means sealingly and movably supporting said sealing plate member for movement both in the axial direction of said pipe member and in the axial direction of said inner shell, whereby, said inner shell may move both in the axial direction of said pipe member and in the direction normal to the axis thereof with respect to said outer shell due to its heat expansion while maintaining said adiabatic zone sealed from said reaction chamber.

4. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:
    a. said inner shell including a first inlet opening for the exhaust gas, b. said outer shell having a second opening correspondingly positioned to the inlet opening provided in said inner shell, c. a pipe member extending inwardly through said second opening and fixed to said inner shell at said first opening, d. a sealing plate member having a third opening corresponding to the outer periphery of said pipe member and being fixed to said pipe member at said third opening and lying between said outer shell and an engine block or exhaust manifold, e. means sealingly and movably supporting said sealing plate member for movement both in the axial direction of said pipe member and in the axial direction of said inner shell, f. said sealing plate member formed of a material resiliently deformable in the axial direction of said pipe member, whereby, said inner shell may move both in the axial direction of said pipe member and in the direction normal to the axis thereof with respect to said outer shell due to its heat expansion while maintaining said adiabatic zone sealed from said reaction chamber.

5. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:

a. said inner shell including a first inlet opening for the exhaust gas, b. said outer shell having a second opening correspondingly positioned to the inlet opening provided in said inner shell, c. a pipe member extending inwardly through said second opening and connected to said inner shell at said first opening, d. a sealing plate member having a third opening corresponding to the outer periphery of said pipe member and movable in the axial direction of said inner shell and between said outer shell and an engine block or manifold, e. means connecting said sealing plate member to said pipe member at said third opening, f. said sealing plate member comprising a disc lying between said outer shell and the engine block or exhaust manifold, and g. means sealingly and slidably supporting said disc for movement and in the axial direction of said inner shell, and wherein at least one of said connecting means between said inner shell and said pipe member and between said pipe member and said sealing plate member is slidable in the axial direction of said pipe member, whereby said inner shell may move both in the axial direction of said pipe member and in the direction normal to the axis thereof with respect to said outer shell due to its heat expansion while maintaining said adiabatic zone sealed from said reaction chamber.

6. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:

a. said inner shell including a first inlet opening for the exhaust gas, b. said outer shell having a second opening correspondingly positioned to the inlet opening provided in said inner shell, c. a pipe member extending inwardly through said second opening and connected to said inner shell at said first opening, d. a sealing plate member having a third opening corresponding to the outer periphery of said pipe member and movable in the axial direction of said inner shell and lying between said outer shell and an engine block or exhaust manifold, e. means connecting said sealing plate member to said pipe member at said third opening, f. means slidably and sealingly supporting said sealing plate member for movement in the axial direction of said inner shell, and g. an inner pipe passing through said pipe member and forming a duct for connecting said reaction chamber directly to said engine block or exhaust manifold, whereby, said inner shell may move both in the axial direction of said pipe member and in the direction normal to the axis thereof with respect to said outer shell due to its heat expansion while maintaining said adiabatic zone sealed from said reaction chamber.

7. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:

a. said inner shell including a first inlet opening for the exhaust gas, b. said outer shell having a second opening correspondingly positioned to the inlet opening provided in said inner shell, c. a pipe member extending inwardly through said second opening and fixed to said inner shell at said first opening, d. a sealing plate member having a third opening corresponding to the outer periphery of said pipe member and movable in the axial direction of said inner shell and lying between said outer shell and an engine block or exhaust manifold, e. means sealingly and slidably engaging said sealing plate member to said pipe member for movement in the axial direction of said pipe member, and f. means slidably and sealingly supporting said sealing plate member for movement in the axial direction of said inner shell, whereby, said inner shell may move both in the axial direction of said pipe member and in the direction normal to the axis thereof with respect to said outer shell due to its heat expansion while maintaining said adiabatic zone sealed from said reaction chamber.

8. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhausting gas therefrom, the improvement comprising:

a. said inner shell including a first inlet opening for the exhaust gas, b. said outer shell having a second opening correspondingly positioned to the inlet opening provided in said inner shell, c. a pipe member extending inwardly through said second opening and being sealingly and slidingly engaged with said inner shell, d. a sealing plate member having a third opening corresponding to the outer periphery of said pipe member and movable in the axial direction of said inner shell and lying between said outer shell and an engine block or exhaust manifold, and fixed to said pipe member at said third opening, and e. means slidably and sealingly supporting said sealing plate member for movement in the axial direction of said inner shell, whereby, said inner shell may move both in the axial direction of said pipe member and in the direction normal to the axis thereof with respect to said outer shell due to its heat expansion while maintaining said adiabatic zone sealed from said reaction chamber.

9. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:
 a. said inner shell including a first inlet opening for the exhaust gas,
 b. said outer shell having a second opening correspondingly positioned to the inlet opening provided in said inner shell,
 c. a pipe member extending inwardly through said second opening and connected to said inner shell at said first opening,
 d. a sealing plate member having a third opening corresponding to the outer periphery of said pipe member and movable in the axial direction of said inner shell and lying between said outer shell and an engine block or exhaust manifold,
 e. means connecting said sealing plate member to said pipe member at said third opening,
 f. flange means fixing said outer shell to the engine block or exhaust manifold,
 g. said sealing plate member is sealingly interleaved by said flange means and the engine block or exhaust manifold and movable in the axial direction of said inner shell,
 h. and at least one of said connection means between said inner shell and said pipe member and between said pipe member and said sealing plate member being slidable in the axial direction of said pipe member, whereby said inner shell may move both in the axial direction of said pipe member and in the direction normal to the axis thereof with respect to said outer shell due to its heat expansion while maintaining said adiabatic zone sealed from said reaction chamber.

10. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:
 a. said inner shell including a first inlet opening for the exhaust gas,
 b. said outer shell having a second opening correspondingly positioned to the inlet opening provided in said inner shell,
 c. a pipe member extending inwardly through said second opening and connected to said inner shell at said first opening,
 d. a sealing plate member having a third opening corresponding to the outer periphery of said pipe member and movable in the axial direction of said inner shell and lying between said outer shell and an engine block or exhaust manifold,
 e. means connecting said sealing plate member to said pipe member at said third opening,
 f. flange means fixing said outer shell to the engine block or exhaust manifold,
 g. said sealing plate member comprising a disc sealingly interleaved by said flange means and said outer shell, and movable in the axial direction of said inner shell, and
 h. wherein at least one of said connection means between said inner shell and said pipe member and between said pipe member and said sealing plate member is slidable in the axial direction of said pipe member, whereby said inner shell may move both in the axial direction of said pipe member and in the direction normal to the axis thereof with respect to said outer shell due to its heat expansion while maintaining said adiabatic zone sealed from said reaction chamber.

11. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:
 a. said inner shell including a first inlet opening for the exhaust gas,
 b. said outer shell having a second opening correspondingly positioned to the inlet opening provided in said inner shell,
 c. a pipe member extending inwardly through said second opening and connected to said inner shell at said first opening,
 d. a sealing plate member having a third opening corresponding to the outer periphery of said pipe member and movable in the axial direction of said inner shell and lying between said outer shell and an engine block or exhaust manifold,
 e. means connecting said sealing plate member to said pipe member at said third opening,
 f. flange means fixing said outer shell to the engine block or exhaust manifold,
 g. an auxiliary base disposed between said outer shell and engine block or exhaust manifold, and
 h. said sealing plate member comprising a disc sealingly interleaved by said flange means and said auxiliary base, and movable in the axial direction of said inner shell, whereby said inner shell may move both in the axial direction of said pipe member and in the direction normal to the axis thereof with respect to said outer shell due to its heat expansion while maintaining said adiabatic zone sealed from said reaction chamber.

12. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:
 a. said inner shell including a first inlet opening for the exhaust gas,
 b. said outer shell having a second opening correspondingly positioned to the inlet opening provided in said inner shell,
 c. a pipe member extending inwardly through said second opening and connected to said inner shell at said first opening,
 d. a sealing plate member having a third opening corresponding to the outer periphery of said pipe member and movable in the axial direction of said inner shell and positioned between said outer shell and an engine block or exhaust manifold,
 e. means connecting said sealing plate member to said plate member at said third opening, f. an inner pipe passing through said pipe member, forming a duct connecting said reaction chamber directly to the engine block or exhaust manifold and having a first flange means positioned between said outer shell and the engine block or exhaust manifold, g. second flange means fixing said outer shell to the engine block or exhaust manifold, h. said sealing plate member comprising a disc sealingly interleaved by said first flange means and said second flange means, and movable in the axial direction of said inner shell, whereby said inner shell may move both in the axial direction of said pipe member and in the direction normal to the axis thereof with respect to said outer shell due to its heat expansion while maintaining said adiabatic zone sealed from said reaction chamber.

13. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:

a. said inner shell including a first inlet opening for the exhaust gas, b. said outer shell having a second opening correspondingly positioned to the inlet opening provided in said inner shell, c. a pipe member extending inwardly through said second opening and connected to said inner shell at said first opening, d. a sealing plate member having a third opening corresponding to the outer periphery of said pipe member and movable in the axial direction of said inner shell and positioned between said outer shell and an engine block or exhaust manifold, e. means connecting said sealing plate member to said pipe member at said third opening, f. an inner pipe passing through said pipe member, forming a duct connecting said reaction chamber directly to the engine block or exhaust manifold and having a flange means fixing said outer shell to said engine block or exhaust manifold, g. said sealing plate member comprising a disc sealingly interleaved by said flange means and said outer shell, and movable in the axial direction of said inner shell;

whereby said inner shell may move both in the axial direction of said pipe member and in the direction normal to the axis thereof with respect to said outer shell due to its heat expansion while maintaining said adiabatic zone sealed from said reaction chamber.

14. In a reactor for purifying an exhaust gas from an internal combustion engine including an engine block and an engine exhaust manifold, said reactor having an inner shell forming a reaction chamber, an outer shell surrounding the outside of said inner shell and defining an adiabatic zone therebetween and being freely movable relative to said inner shell due to heat expansion thereof, an inlet for introducing exhaust gas into said reaction chamber and an outlet for exhausting exhaust gas therefrom, the improvement comprising:

a. said inner shell including a first inlet opening for the exhaust gas, b. said outer shell having a second opening correspondingly positioned to the inlet opening provided in said inner shell, c. a pipe member extending inwardly through said second opening and connected to said inner shell at said first opening, d. a sealing member having a third opening corresponding to the outer periphery of said pipe member and movable in the axial direction of said inner shell and positioned between said outer shell and an engine block or exhaust manifold, e. means connecting said sealing plate member to said pipe member at said third opening, f. an inner pipe passing through said pipe member, forming a duct connecting said reaction chamber directly to the engine block or exhaust manifold and having a flange means fixing said outer shell to the engine block or exhaust manifold, g. an auxiliary base disposed between said outer shell and the engine block or exhaust manifold, h. said sealing plate member comprising a disc sealingly plate interleaved by said flange and said auxiliary base, and movable in the axial direction of said inner shell, whereby said inner shell may move both in the axial direction of said pipe member and in the direction normal to the axis thereof with respect to said outer shell due to its heat expansion while maintaining said adiabatic zone sealed from said reaction chamber.

15. A reactor as set forth in claim 6, wherein said inner pipe fixed to the engine block or exhaust manifold has smaller outer diameter than the inner diameter of said pipe member so as not to restrict movement of said pipe member in the axial direction and in a direction normal to its axis.

16. A reactor as set forth in claim 15, wherein said inner pipe sealingly engages said pipe member so that said reaction chamber and said adiabatic space remains sealed during relative movement between said inner pipe and said pipe member in the direction normal to their axis.

17. A reactor as set forth in claim 15, wherein said inner pipe has a smaller outer diameter than the inner diameter of said pipe member, and a ring is inserted between said pipe member and said inner pipe so that said reaction chamber and said adiabatic space are maintained sealed, while said inner pipe is moved relative to said pipe member in a direction normal to the axis thereof.

* * * * *

UNITED STATES PATENT OFFICE
CERTIFICATE OF CORRECTION

Patent No. 3,653,205　　　　　　　　　　　Dated　April 4, 1972

Inventor(s)　Tomoo Tadokoro

It is certified that error appears in the above-identified patent and that said Letters Patent are hereby corrected as shown below:

Column 12, line 31 (claim 14, phrase h), delete [plate].

Signed and sealed this 10th day of October 1972.

(SEAL)
Attest:

EDWARD M. FLETCHER, JR.　　　　　ROBERT GOTTSCHALK
Attesting Officer　　　　　　　　　Commissioner of Patents